US008285762B2

(12) United States Patent
Cannon et al.

(10) Patent No.: US 8,285,762 B2
(45) Date of Patent: Oct. 9, 2012

(54) MIGRATION OF METADATA AND STORAGE MANAGEMENT OF DATA IN A FIRST STORAGE ENVIRONMENT TO A SECOND STORAGE ENVIRONMENT

(75) Inventors: David Maxwell Cannon, Tucson, AZ (US); Robert Gerard LaBrie, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 72 days.

(21) Appl. No.: 12/778,075

(22) Filed: May 11, 2010

(65) Prior Publication Data

US 2011/0282835 A1 Nov. 17, 2011

(51) Int. Cl.
*G06F 17/30* (2006.01)
(52) U.S. Cl. ........................................ 707/825; 709/203
(58) Field of Classification Search .................. 707/622, 707/825
See application file for complete search history.

(56) References Cited

U.S. PATENT DOCUMENTS

| 8,041,735 B1 * | 10/2011 | Lacapra et al. | 707/783 |
| 8,156,281 B1 * | 4/2012 | Grosner et al. | 711/114 |
| 2003/0195895 A1 | 10/2003 | Nowicki et al. | |
| 2004/0225719 A1 * | 11/2004 | Kisley et al. | 709/212 |
| 2006/0248038 A1 | 11/2006 | Kaplan et al. | |
| 2006/0277225 A1 | 12/2006 | Mark et al. | |
| 2007/0038822 A1 * | 2/2007 | Correl | 711/162 |
| 2008/0010325 A1 | 1/2008 | Yamakawa | |
| 2009/0210431 A1 | 8/2009 | Marinkovic et al. | |

FOREIGN PATENT DOCUMENTS

WO 2006012418 2/2006

OTHER PUBLICATIONS

International Search Report and Written Opinion for International Application No. PCT/EP2011/057439, filed May 9, 2011, 9 pgs, mailed Jul. 20, 2011.

* cited by examiner

*Primary Examiner* — Cheryl Lewis
*Assistant Examiner* — Scott A Waldron
(74) *Attorney, Agent, or Firm* — David W. Victor; Konrad Raynes and Victor LLP

(57) ABSTRACT

Provided are a computer program product, method, and system for migration of metadata and storage management of data in a first storage environment to a second storage environment. A migration request is processed to migrate metadata and storage management of data in a first storage environment to a second storage environment, wherein the first storage environment has a first storage server, a first storage media, and first metadata describing first data objects stored in the first storage media, and wherein the second storage environment has a second storage server, a second storage media, and second metadata for second data objects stored in the second storage media. The first metadata is copied to the second storage environment to incorporate with the second metadata. The first metadata incorporated into the second metadata is modified to indicate first server information used by the second server to communicate with the first server to access the migrated data from the first storage media. The migration request is completed in response to incorporating the first metadata into the second metadata, wherein the first data objects remain in the first storage media after completing the migration request.

23 Claims, 7 Drawing Sheets

Data Object Metadata

Volume Metadata

Storage Pool Metadata

Device Class Metadata

MIGRATION OF METADATA AND STORAGE MANAGEMENT OF DATA IN A FIRST STORAGE ENVIRONMENT TO A SECOND STORAGE ENVIRONMENT

BACKGROUND OF THE INVENTION

1. Field of the Invention

The present invention relates to a method, system, and computer program product for migration of metadata and storage management of data in a first storage environment to a second storage environment.

2. Description of the Related Art

A storage management server is deployed on a system for storing data such as backup data, archive data and space managed data from clients. A storage management server provides a repository for data storage, consisting of various devices such as disk and tape and a catalog (possibly a database) which tracks metadata, including storage locations, for the stored data. The environments for hosting a storage management server require substantial investment in hardware, software, storage devices, infrastructure and skilled personnel to administer the storage management server. For a variety of reasons, it may be necessary to move the storage management server from the existing environment to another environment. Tangibles such as cost of maintaining the host system, procurable skills, organizational policies and device availability are considerations that make it necessary to move storage management servers from one system environment to another.

To migrate data from one environment to another, an Export/Import storage management operation may be performed to copy both repository data and metadata from one storage management server in one environment to another storage management server in another environment. Another technique for migrating involves copying the data and metadata to a tape volume and physically transporting the tape volume to the new storage environment and then importing the data and metadata on the tape cartridge into the storage systems in the new environment. The data migration may comprise many terabytes or even petabytes of data, making it impractical to transfer that data to the new environment.

SUMMARY

Provided are a computer program product, method, and system for migration of metadata and storage management of data in a first storage environment to a second storage environment. A migration request is processed to migrate metadata and storage management of data in a first storage environment to a second storage environment, wherein the first storage environment has a first storage server, a first storage media, and first metadata describing first data objects stored in the first storage media, and wherein the second storage environment has a second storage server, a second storage media, and second metadata for second data objects stored in the second storage media. The first metadata is copied to the second storage environment to incorporate with the second metadata. The first metadata incorporated into the second metadata is modified to indicate first server information used by the second server to communicate with the first server to access the migrated data from the first storage media. The migration request is completed in response to incorporating the first metadata into the second metadata, wherein the first data objects remain in the first storage media after completing the migration request.

DETAILED DESCRIPTION

The described embodiments provide a technique for migrating data by migrating metadata and storage management of data in a first storage environment to a second storage environment. The first storage environment has a first storage server, a first storage media, and first metadata describing first data objects stored in the first storage media and the second storage environment has a second storage server, a second storage media, and second metadata for second data objects stored in the second storage media. The described embodiments allow for the data to remain in the first storage environment after the migration by copying the first metadata to the second storage environment to incorporate with the second metadata and then modifying the first metadata incorporated into the second metadata to indicate first server information used by the second server to communicate with the first server to access the migrated data from the first storage media. With the described embodiments, the migration request is completed in response to incorporating the first metadata into the second metadata while the first data objects remain in the first storage media after completing the migration request. This allows the data objects to be left in their current first storage media in the first storage environment, but allow for the transfer of the management of the data remaining in the first storage environment to the second server in the second storage environment.

Figure 1:
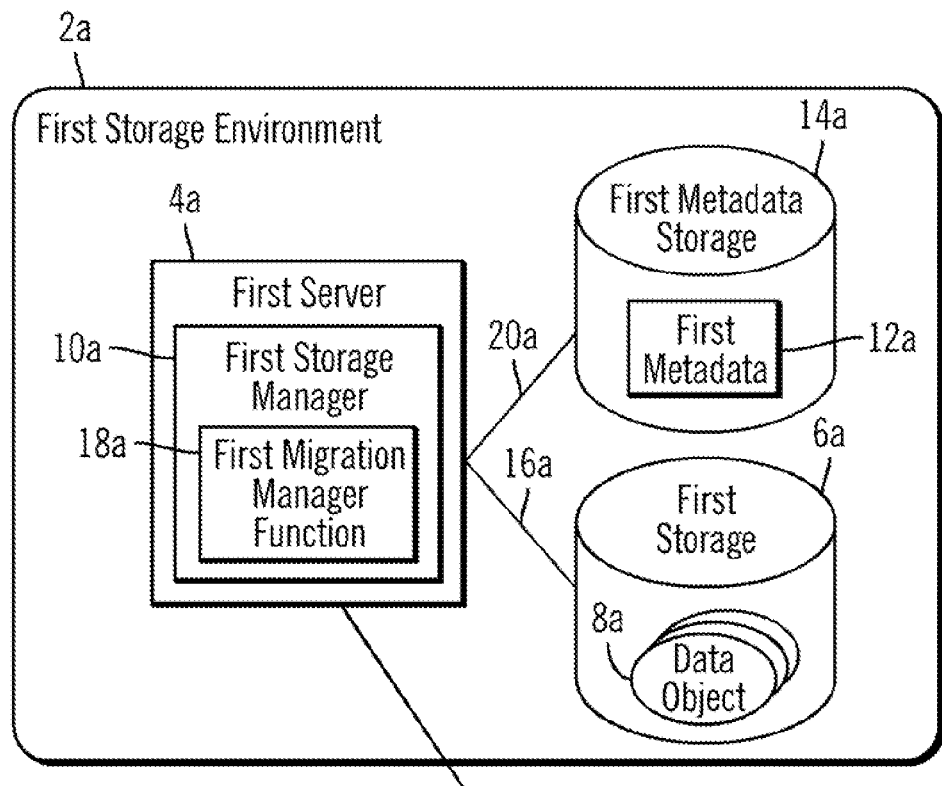
FIG. 1 illustrates an embodiment of storage environments.
Figure 1:
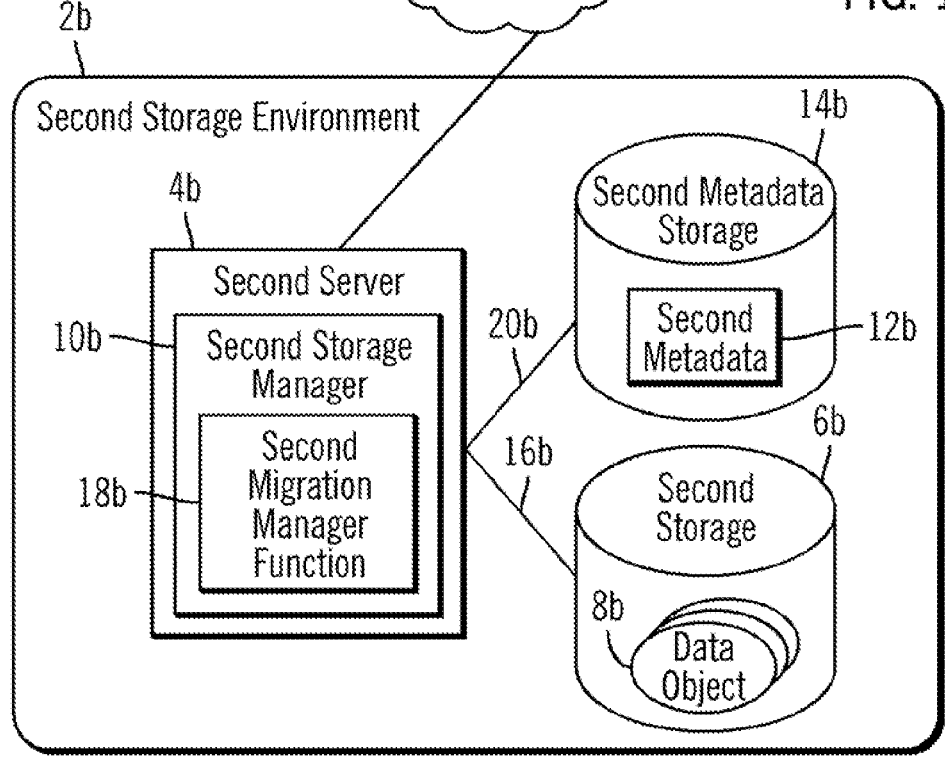

FIG. 1 illustrates an embodiment of a first computing environment 2a and second computing environment 2b. The computing environment 2a includes a first server 4a managing access to a first storage media 6a having data objects 8a. The first server 4a includes a first storage manager 10a that maintains first metadata 12a in a first metadata storage media 14a. The first storage manager 10a uses the first metadata 12a to manage the data objects 8a, such as handling client requests for storing and retrieving data and enforcing policies for data placement and retention. The first storage manager 10a includes a first migration function 18a to manage the migration of data objects 8a in the first storage media 6a to another location. The first server 4a may communicate with the first storage media 6a over a connection 16a and connect to the first metadata storage media 14a over connection 20a.

The second computing environment 2b includes a second server 4b managing access to a second storage media 6b having data objects 8b. The second server 4b includes a second storage manager 10b that maintains second metadata 12*b* in a second metadata storage media 14*b*. The second storage manager 10*b* uses the second metadata 12*b* to manage the data objects 8*b*, such as handling client requests for storing and retrieving data and enforcing policies for data placement and retention. The second storage manager 10*b* includes a second migration function 18*b* to manage the migration of data objects 8*b* in the second storage media 6*b* to another location. The second server 4*b* may communicate with the second storage media 6*b* over a connection 16*b* and connect to the second metadata storage media 14*b* over connection 20*b*. The first 4*a* and second 4*b* servers communicate over a network 22.

The first 4*a* and second 4*b* servers may comprise an enterprise storage server, storage controller, blade server, general purpose server, desktop computer, workstation, telephony device, personal digital assistant (PDA), etc., or other device used to manage I/O requests to attached first 6*a* and second 6*b* storages. Further, the first server 4*a* may comprise a library media changer that mounts and dismounts tape volumes and cartridges, and can control a tape drive to position a tape read/write head with respect to different positions on a tape media in a tape cartridge.

The storage media components 6*a*, 6*b*, 14*a*, 14*b* may comprise storage media implemented in one or more storage devices known in the art, such as interconnected hard disk drives (e.g., configured as a DASD, RAID, JBOD, etc.), magnetic tape, solid state storage devices, electronic memory, etc. The first 14*a* and second 14*b* metadata storage media may be implemented in separate storage devices that are in storage external to the servers 4*a*, 4*b* or implemented in local storage in the first 4*a* and second 4*b* servers. Further, the storage media 6*a* and 14*a* in the first storage environment 2*a* may be implemented in the same or different storage devices and the storage media 6*b* and 14*b* in the second storage environment 2*b* may be implemented in the same or different storage devices. The storage media 6*a*, 6*b*, 14*a*, 14*b* may be implemented in a distributed storage environment or network storage environment, such as "cloud" storage.

The network 22 may comprise as a Local Area Network (LAN), Storage Area Network (SAN), Wide Area Network (WAN), wireless network, etc.

In certain embodiments, the first server 4*a* and second server 4*b* may use different communication protocols to communicate with the attached first 6*a* and second 6*b* storages, respectively. In such embodiments, the second server 4*b* may not support the communication protocol to directly access the first storage media 6*a* in the first storage environment 2*a*.

Figure 2:
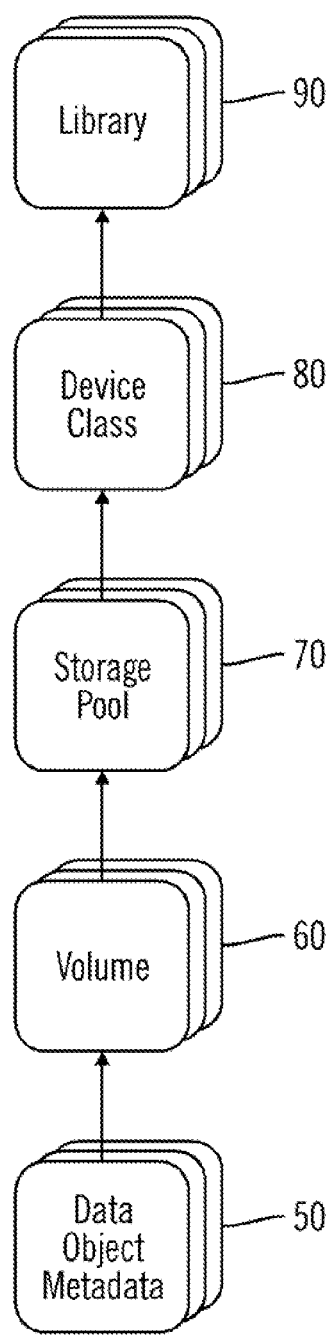
FIG. 2 illustrates a prior art implementation of metadata objects describing data in storage.

FIG. 2 illustrates an embodiment of metadata in the first 12*a* and second 12*b* metadata that represent data objects, media, device classes, and libraries defined in the storages 6*a*, 6*b* in a manner known in the art. The data object metadata 50 provides information on data objects 8*a*, 8*b* stored in the storages 6*a*, 6*b*. Volume metadata 60 provides information on volumes configured in the storage 6*a*, 6*b* in which the data objects 8*a*, 8*b* are stored. Storage pool metadata 70 provides information on storage pools comprising a logical entity that represents a collection of volumes, where each storage pool may represent one type of media. Volumes can be added to or removed from storage pools without interrupting server operations. Device class metadata 80 defines the type of storage hardware used for a particular storage pool. The device class may indicate the storage device type and links the storage pool to the specific operating system-defined device (in the case of removable media devices). That device class metadata specifies a device type and media management information, such as recording format, estimated capacity, and labeling prefixes. Library metadata 90 provides a further level of abstraction representing a storage entity that contains a media changer in addition to drives and tapes for storing data.

The metadata structure of FIG. 2 is hierarchical, such that data objects metadata 50 are associated with volume metadata 60 representing volumes in which the particular data objects are stored, and volume metadata 60 is associated with storage pool metadata 70 representing storage pools in which the volumes are associated, and storage pool metadata 70 is associated with device class metadata 80 providing further information on the storage media and devices in which the storage pool is included. Each device class is further associated with a library.

Each of the metadata objects 50, 60, 70, 80, and 90 may be implemented as a separate table in a relational database, where each entry in the table represents an instance of the element, i.e., data object, volume, storage pool, device class, library. In further embodiments, the metadata objects 50, 60, 70, 80, and 90 may be implemented in other data structures, such as an object oriented database, flat file, etc.

Figure 3:
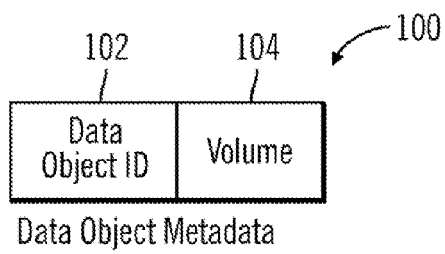
FIG. 3 illustrates an embodiment of data object metadata.

FIG. 3 is an embodiment of an entry 100 in the data object metadata 50, such as a data object table in a relational database, including a data object identifier (ID) 102 identifying the data object and a volume 104 in which the data object is stored.

Figure 4:
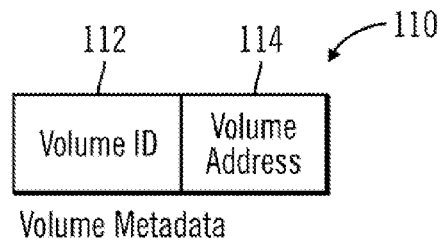
FIG. 4 illustrates an embodiment of volume metadata.

FIG. 4 is an embodiment of an entry 110 in the volume metadata 60, such as a volume table in a relational database, including a volume ID 112 and a volume address 114, such as the serial number of the volume.

Figure 5:
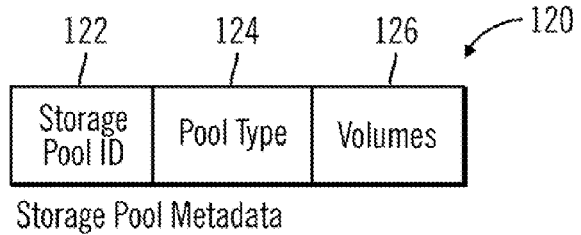
FIG. 5 illustrates an embodiment of storage pool metadata.

FIG. 5 is an embodiment of an entry 120 in the storage pool metadata 70, such as a storage pool table in a relational database, including a storage pool ID 122, a pool type 124 indicating the type of media of the volumes included in the storage pool, and the volumes 126 included in the storage pool.

Figure 6:
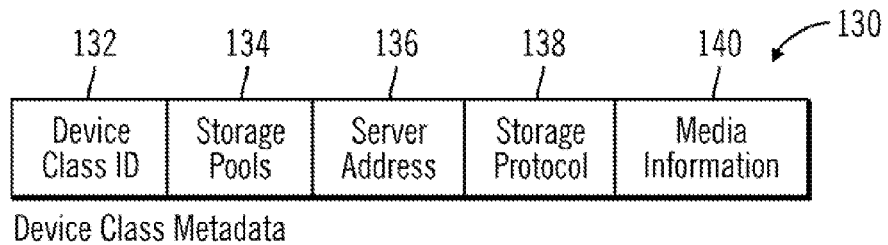
FIG. 6 illustrates an embodiment of device class metadata.

FIG. 6 is an embodiment of an entry 130 in the device class metadata 80, such as a device class table in a relational database, including a device class ID 132, storage pools 134 associated with the device class, a server address 136 of a server 4*a*, 4*b* that performs management operations for the storage pools assigned to the device class, a storage protocol 138 of a storage command language used to communicate with the server, such as Small Computer System Interface (SCSI), Fibre Connectivity (FICON), Fibre Chanel, etc., and media information 140 on the types of media assigned to the device class. The server address 136 may include a network address, such as an Internet Protocol (IP) address, a port address, etc.

Figure 7:
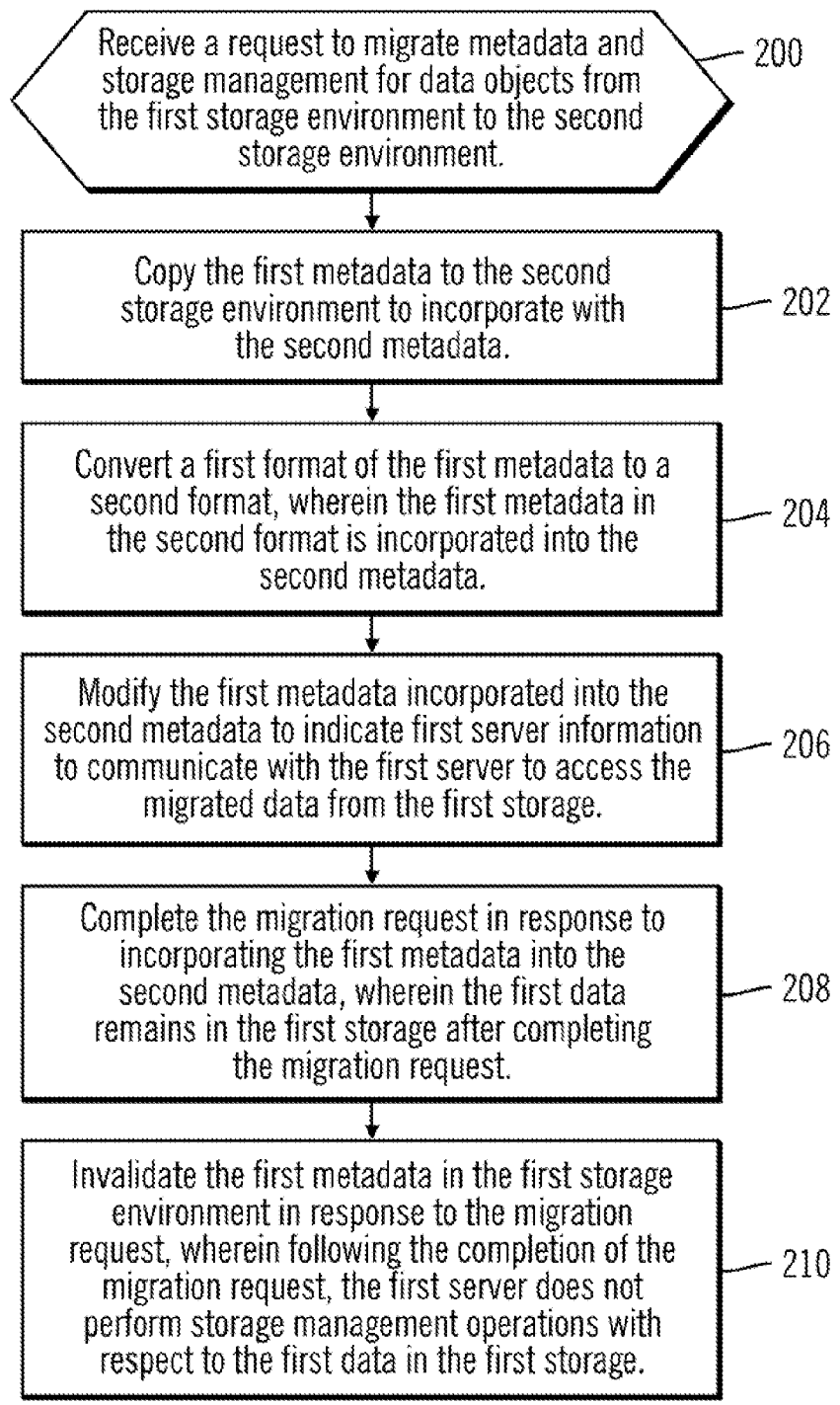
FIG. 7 illustrates an embodiment of operations to migrate metadata and storage management of data in a first storage environment to a second storage environment.

FIG. 7 illustrates an embodiment of operations performed by the first 18*a* or second 18*b* migration manager function to migrate first metadata 12*a* and storage management of data objects 8*a* in the first storage media 6*a* from the first storage environment 2*a* to the second storage environment 2*b*. With the described embodiments, the migration is completed when the first metadata 12*a* for the data objects 8*a* to migrate is copied to the second storage environment 2*b*, so that the second server 4*b* in the second storage environment 2*b* manages the data objects 8*a* that remain stored in the first storage media 6*a* in the first storage environment 2*a*. Thus, in one embodiment, migration involves the transfer of metadata and storage management of data objects from the first storage environment 2*a* to the second storage environment 2*b*. Control begins with one of the migration manager functions 18*a*, 18*b*, such as the first migration manager function 18*a* receiving (at block 200) a request to migrate metadata and storage management of data objects 8*a* from the first storage environment 2*a* to the second storage environment 2*b*. In response to the request, the second migration manager function 18*b* copies (at block 202) the first metadata 12a to the second storage environment 2b to incorporate with the second metadata 12b in the second metadata storage media 14b. In copying the first metadata 12a to the second metadata 12b, the second migration manager function 18b may add the data object metadata 50, volume metadata 60, storage pool metadata 70, device class metadata 80, and library metadata 90 in the first metadata 12a, for the data objects in the first storage media 6a, to the second metadata 12b in the second metadata storage media 14b. For instance, the second migration manager function 18b may add entries in the tables for the first metadata 12a to the tables for the different types of metadata 50, 60, 70, 80, and 90 in the second metadata 12b.

The second migration manager function 18b may convert (at block 204) a first format of the first metadata 14a to a second format, wherein the first metadata 14a in the second format is incorporated into the second metadata 14b. In one embodiment, the first metadata 14a may be in a format such as Extended Binary Coded Decimal Interchange Code (EBCDIC) and the second metadata 14b may be in a format such as American Standard Code for Information Interchange (ASCII), such that the data in the first metadata 14a needs to be converted from EBCDIC to ASCII in order to incorporate in the second metadata 14b.

The second migration manager function 18b may modify (at block 206) the first metadata 14a incorporated into the second metadata 14b to indicate first server 4a information to enable the second server 4b to communicate with the first server 4a to access the data objects 8a in the first storage media 6a. In one embodiment, the second migration manager function 18b may modify the server address 136 in the device class metadata 80 for the first storage media 6a to indicate the server address and port of the first server 4a. This modification in the device class metadata 80 would then apply to all storage pools, volumes, and data objects associated with that device class metadata 80. The first 18a and/or second 18b migration manager functions 18a, 18b complete the migration request in response to the incorporation of the first metadata 12a into the second metadata 12b, wherein the first data objects 8a remain in the first storage media 6a after completing the migration request. After the migration, the second server 4b performs the storage management functions on the data objects 8a in the first storage media 6a whose metadata was migrated. The first 18a and/or second 18b migration manager function may then invalidate (at block 210) the first metadata 12a in the first storage environment 2a in response to the migration request, wherein following the completion of the migration request, the first server 4a does not perform storage management operations with respect to the first data in the first storage media. In one embodiment, after the migration, the first server 4a does not maintain any metadata and is relegated to operating as an I/O engine that responds to requests from the second server 4b to perform read and write operations with respect to the first storage media 6a. In embodiments where the first storage media 6a comprises a tape system, the operations may comprise operations to mount and dismount tape cartridges maintained in the first storage media 6a and control a tape drive to position a read/write head to different locations on a tape media in a mounted tape cartridge. In such embodiments, all metadata and necessary configuration information for the first storage media 6a is maintained by the second server 4b. In an alternative embodiment, the first server 4a may maintain certain metadata and configuration information to access and manage the first storage media 6a.

Figure 8:
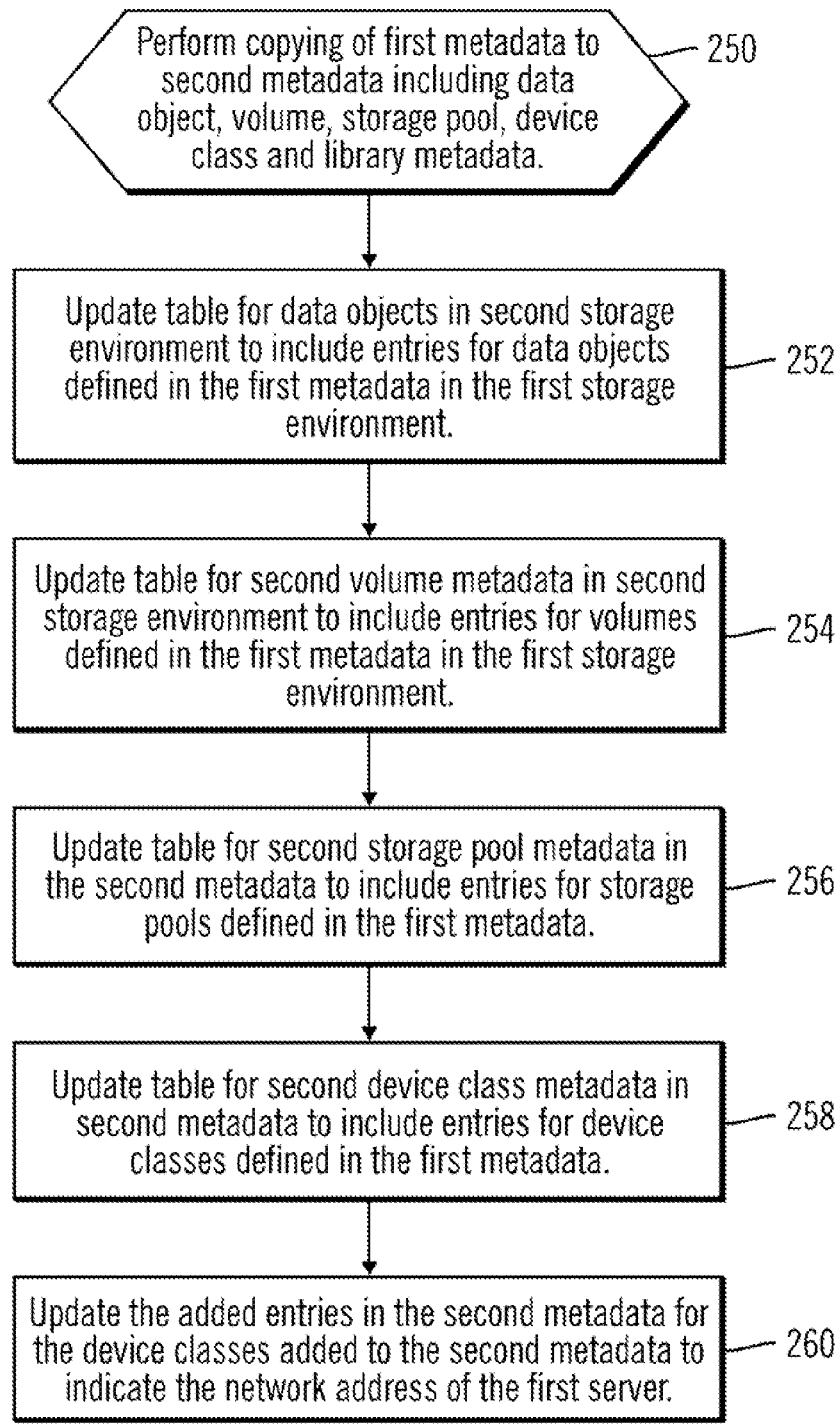
FIG. 8 illustrates an embodiment of operations to incorporate first metadata in a first storage environment to second metadata in a second storage environment.

FIG. 8 illustrates an embodiment of how the first metadata 12a may be copied and incorporated into the second metadata 12b as performed in steps 202 and 206 in FIG. 7. Upon initiating an operation (at block 250) to copy first metadata 12a to second metadata 12b including data object metadata 50, volume 60, storage pool 70, device class 80 and library 90 metadata, the second migration function manager 18b updates (at block 252) a table for data objects in the second storage environment 2b to include entries 100 (FIG. 3) for the data objects 8a that are defined in the first metadata 12a in the first storage environment 2a. The second migration manager function 18b further updates (at block 254) a table for the second volume metadata 60 in the second storage environment 2b to include entries 110 (FIG. 4) for volumes defined in the first metadata 12a in the first storage environment 2a. The second migration manager function 18b further updates (at block 256) a table for storage pool metadata 70 in the second metadata 12b to include entries 120 (FIG. 5) for storage pools defined in the first metadata 12a in the first storage environment 12a. The second migration manager function 18b further updates (at block 258) a table for second device class metadata 80 in the second metadata 12b in the second storage environment 2b to include entries 130 (FIG. 6) for device classes defined in the first metadata 12a. The second migration manager function 18b further updates (at block 260) the entries for the device classes in the first metadata added to the second metadata 12b to indicate the network address of the first server 4a.

In certain embodiments, the second device class metadata 80 is updated to indicate the network address of the first server 4a. In alternative embodiments, the first server 4a network address may be stored in other sections of the second metadata 12b, such as storage pool 70, volume 60 and/or data object 50 metadata. Further, in certain embodiments, the metadata described with respect to FIGS. 2-6 may be organized in a single data structure or in different arrangements of data structures than shown in FIGS. 2-6.

Operations of FIGS. 7 and 8 described as performed by one of the first 18a or second 18b migration function manager may be performed by either of the migration function managers 18a, 18b.

Figure 9:
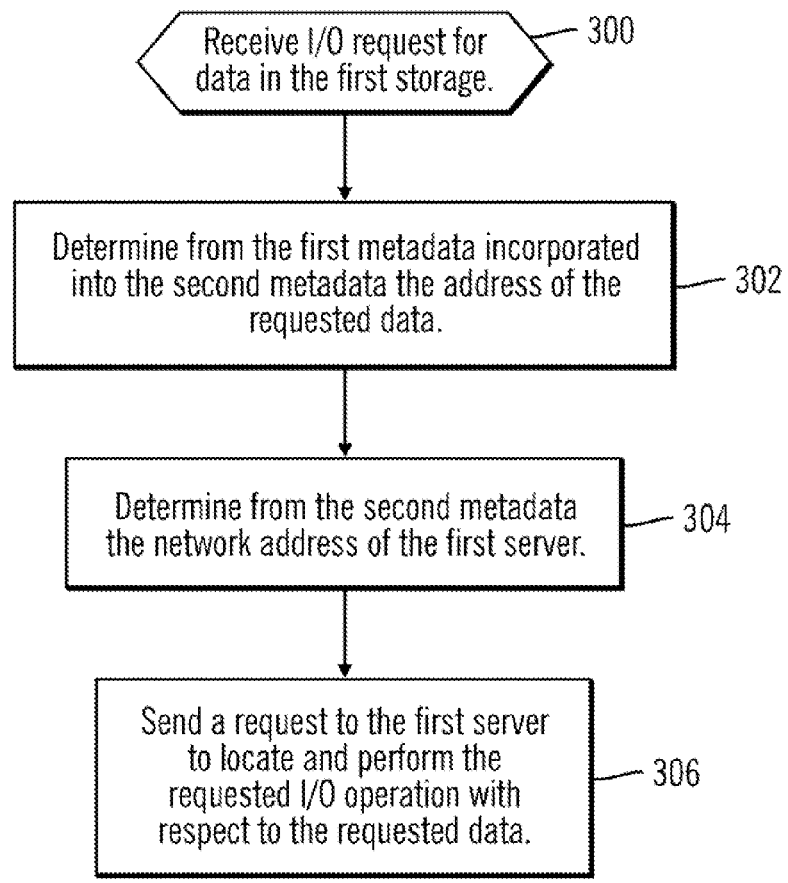
FIG. 9 illustrates an embodiment of operations to process a read/write request to data remaining in the first storage environment from which the metadata and storage management was migrated.

FIG. 9 illustrates an embodiment of read/write processing operations performed by the second storage manager 10b in the second storage environment 2b to which the first metadata 12a was migrated. Upon receiving (at block 300) an Input/Output (I/O) request for data in the first storage media 6a following the migration of the first metadata 12a, the second storage manager 10b determines (at block 302) from the first metadata 12a incorporated into the second metadata 12b the address of the requested data in the first storage media 6a, such as a relative block address, logical block address (LBA), track, etc. The second storage manager 10b further determines (at block 304) from the second metadata 12b the network address of the first server 4a. In one embodiment, the network address may be determined from the server address 136 in the device class metadata 130 for the device class with which the volume and storage pool including the requested data object is located. The second storage manager 10b sends (at block 306) a request to the first server 4a to locate and perform the requested I/O operation with respect to the requested data object in the first storage media 6a, which may involve performing a read or write and returning data or completion of the read/write operation to the second storage manager 10b. In certain embodiments, the second server 4b transmits primitive or low level storage commands to control the first server 4a using a network communication protocol such as TCP/IP, Fibre Channel, FICON, SCSI, etc. For instance, the second server 4b may instruct the first server 4a to perform a storage operation by sending storage commands, such as commands to perform mount, locate, position, write, and read operations. The second server 4b may use the storage protocol indicated in the storage protocol field 138 (FIG. 6) in the device class metadata. The storage commands may then be wrapped in a communication protocol, such as TCP/IP, to send to the first server 4a.

In further embodiments of FIG. 9, the second storage manager 10b may receive a request to mount and dismount tape cartridges and position a tape drive read/write head to different locations in a mounted tape cartridge maintained in the first storage environment 2a. In such embodiments, the second storage manager 10b would send the mount, dismount or position to location on tape commands to the first server 4a to perform with respect to tape cartridges maintained in the first storage media 6a.

Figure 10:
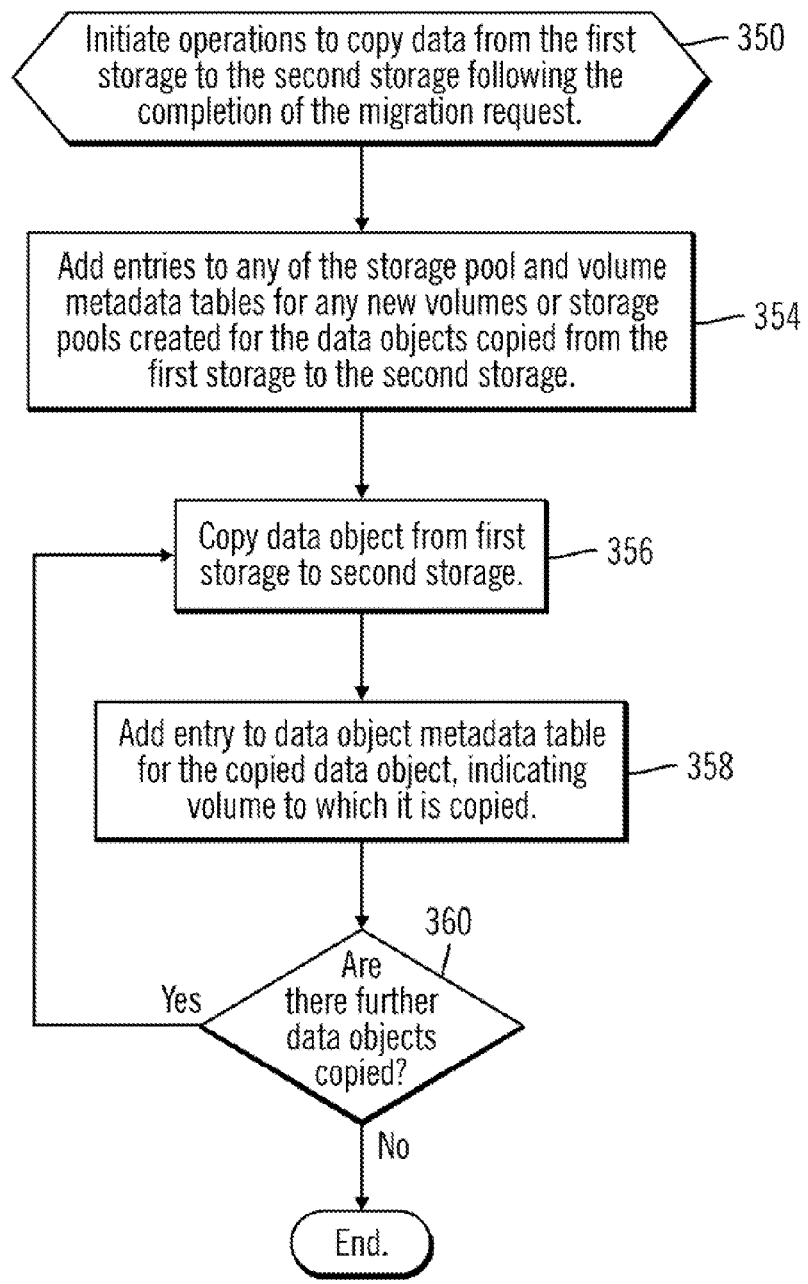
FIG. 10 illustrates an embodiment of operations to copy data from the first storage environment to the second storage environment after the completion of the migration of the metadata.

FIG. 10 illustrates an embodiment of operations performed by the second storage manager 10b to copy data from the first storage media 6a to the second storage media 6b following the completion of the migration of the first metadata 12a and storage management to the second storage environment 2b. Before the data can be copied or moved, the target storage entities, such as library, drives, device class, storage pool, etc., would have to be configured to reference in the copy or move operations. In certain implementations, the operations of FIG. 10 are not part of the migration operation, but are part of an optional further operation to allow the transfer of the first data objects 8a from the first storage media 6a to the second storage media 6b. Upon initiating operations (at block 350) to copy data 8a from the first storage media 6a to the second storage media 6b following the completion of the migration request, the second storage manager 10b further adds (at block 354) entries 110, 120 (FIGS. 4 and 5) to any of the storage pool 70 and volume 60 metadata tables or objects for any new volumes or storage pools created for the data objects 8a copied from the first storage media 6a to the second storage media 6b. The data object 8a is copied (at block 356) from the first storage media 6a to the second storage media 6b and an entry 100 is added (at block 358) to the data object metadata 50 table for the copied data object 8a, indicating the volume 104 to which it is copied. If (at block 360) there are further data objects 8a in the first storage media 6a to copy, then control proceeds back to block 356 to copy the further data objects 6a.

FIG. 10 describes embodiments copying data from first storage media 6a to second storage media 6b. Alternatively, data in the second storage media 6b may be copied to a new location in the first storage media 6a, and/or data in the first storage media 6a may be copied to a new location in the first storage media 6a. In such cases, the second metadata 12 for the data objects copied from the second storage media 6b to the first storage media 6a or copied between locations in the first storage media 6a would be updated to reflect the new location of the data in the first storage media 6a or second storage media 6b.

The described copy operations of FIG. 10 may be part of a move operation with the additional operation of deleting the data in the source or initial storage 6a, 6b from which the data is moved.

The described embodiments provide for repository data 8a in a first storage environment 2a to be left on preexisting storage 6a while constructing a new storage system in the second storage environment 2b using the first metadata 12a incorporated into the second metadata 12b to catalog and reference the preexisting repository data 8a. The second server 4b can utilize devices available in the new second storage environment 2b while maintaining access to preexisting data and supporting storage 6a infrastructure in the first storage environment 2a.

In the described embodiment, once the first metadata 12a and storage management services are incorporated and migrated into the second metadata 12b, the data objects 8a in the first storage media 6a are accessible via the first server 4a and the first storage media 6a is considered part of the storage hierarchy of the second storage environment 2b. The second storage manager 10b in the second storage environment 2b maintains the metadata catalog, performs logic for most storage management functions such as client requests for storing and retrieving data, and enforces policies for data placement and retention for the migrated data remaining in the first storage media 6a in the first storage environment. Further, the first server 4a in the first storage environment 2a continues to perform primitive storage functions (mount, locate, write, read) to devices in the legacy environment 2a as requested by the second storage manager 4b in the second storage environment 2b.

With the described embodiments, legacy data in the legacy (first 2a) storage environment can be left on current storage devices 6a, but management of the data objects 8a is transferred to the storage manager 10b in the new second storage environment 2b, thus, avoiding the need for immediately transferring large amounts of data to the new environment 2b. Further, the second storage manager 10b in the second storage environment 2b, which may comprise the new storage system, can utilize devices and storage systems available in the new environment 2b while also leveraging the capabilities of the environment of the older storage environment 2a for accessing legacy data or for storage of new data for eventual retrieval. The described embodiments allow for continued return on investment by leveraging the storage infrastructure of the storage environment 2a from which the metadata was migrated.

Moreover, with described embodiments, data in the first storage environment 2a, could represent part of a complete storage hierarchy, with the capability to move/copy data between devices in the first storage media 6a and devices in the second storage media 6b managed directly in the second storage environment 2b. Further, as the storage 6a devices in the first storage environment 2a approach end of life, the capability exists for data to gradually be transferred to storage 6b in the second storage environment 2b.

Further, with the described embodiments, data can be stored offsite in the first storage environment 2a, while centralizing storage management operations and metadata at the new second storage environment 2b. Moreover, algorithms for data management can effectively be isolated in the second server 4b in the second storage environment 2b, thus reducing the need for software development and updates in the first storage environment 2a.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 7-10 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for processing a migration request, the computer program product comprising a computer readable storage medium having computer readable program code embodied therein that executes to perform operations, the operations comprising:

processing a migration request to migrate metadata and storage management of data in a first storage environment to a second storage environment, wherein the first storage environment has a first storage server, a first storage media, and first metadata describing first data objects stored in the first storage media, wherein the first metadata includes first data object metadata providing information on the first data objects in the first storage media, including a volume in which each first data object is stored, first volume metadata including information on volumes in the first storage media, first storage pool metadata providing information on volumes associated with the storage pool, and first device class metadata providing information on the first server used to manage volumes indicated in the first volume metadata and indicated in the first storage pool metadata, wherein the second storage environment has a second storage server, a second storage media, and second metadata for second data objects stored in the second storage media, wherein the second metadata includes second data object metadata providing information on the second data objects in the second storage media, including a volume in which each second data object is stored, second volume metadata including information on volumes in the second storage media, second storage pool metadata providing information on volumes associated with the storage pool, and second device class metadata providing information on the second server used to manage volumes indicated in the first volume metadata and indicated in the first storage pool metadata;

copying the first metadata to the second storage environment to incorporate with the second metadata, wherein incorporating the first metadata into the second metadata comprises including the first data object metadata, first volume metadata, first storage pool metadata, and first device class metadata into the second data object metadata, second volume metadata, second storage pool metadata, and second device class metadata, respectively;

modifying the first device class metadata incorporated into the second device class metadata to indicate first server information used by the second server to communicate with the first server to access the migrated data from the first storage media; and completing the migration request in response to incorporating the first metadata into the second metadata, wherein the first data objects remain in the first storage media after completing the migration request, and wherein the first data objects are copied to the second storage media after completing the migration request.

2. The computer program product of claim 1, wherein the first metadata is maintained in a first format and the second metadata is maintained in a second format, and wherein incorporating the first metadata into the second metadata comprises:

converting the first metadata to the second format, wherein the first metadata in the second format is incorporated into the second metadata.

3. The computer program product of claim 1, wherein prior to processing the migration request, the first server uses the first metadata to perform storage management operations with respect to the first data objects, further comprising:

using, by the second server, the first metadata incorporated into the second metadata to perform storage management operations with respect to the first data objects stored in the first server.

4. The computer program product of claim 3, further comprising:

invalidating the first metadata in the first storage environment in response to the migration request, wherein following the completion of the migration request, the first server does not perform storage management operations with respect to the first data objects in the first storage media.

5. The computer program product of claim 3, wherein the storage management operations comprise handling client requests for storing and retrieving the first data objects stored in the first storage media and enforcing policies for data placement and retention of the first data objects in the first storage media, and wherein following the completion of the migration request, the first server performs primitive storage functions in response to communications from the second server comprising mount, locate, write and read operations.

6. The computer program product of claim 1, further comprising:

receiving, in the second storage environment, a storage operation request;

determining, by the second server, from the first metadata incorporated into the second metadata that the storage operation request is directed to a location in the first storage media;

sending, by the second server, commands to the first server to have the first server implement the storage operation request with respect to the first storage media.

7. The computer program product of claim 6, wherein the commands sent by the second server include at least one command of a set of storage commands comprising a read request, a write request, a request to mount a tape cartridge, a request to dismount a tape cartridge, or a request to position a tape drive read/write head to a location in the tape cartridge.

8. The computer program product of claim 6, wherein the first metadata incorporated into the second metadata indicates a network address of the first server and identifier of a volume including the first data objects in the first storage media, and wherein sending the request comprises sending the request to the network address of the first server indicating the volume including the requested data.

9. The computer program product of claim 1, wherein the operations further comprise:
  moving data objects described in the second data object metadata from the first storage media to a new location in the first storage media or the second storage media or from the second storage media to a new location in the first storage media; and
  updating the second data object metadata for the moved data objects to indicate the new location of the moved data objects in the first storage media or the second storage media.

10. A method, comprising:
  processing a migration request to migrate metadata and storage management of data in a first storage environment to a second storage environment, wherein the first storage environment has a first storage server, a first storage media, and first metadata describing first data objects stored in the first storage media, wherein the first metadata includes first data object metadata providing information on the first data objects in the first storage media, including a volume in which each first data object is stored, first volume metadata including information on volumes in the first storage media, first storage pool metadata providing information on volumes associated with the storage pool, and first device class metadata providing information on the first server used to manage volumes indicated in the first volume metadata and indicated in the first storage pool metadata, wherein the second storage environment has a second storage server, a second storage media, and second metadata for second data objects stored in the second storage media, wherein the second metadata includes second data object metadata providing information on the second data objects in the second storage media, including a volume in which each second data object is stored, second volume metadata including information on volumes in the second storage media, second storage pool metadata providing information on volumes associated with the storage pool, and second device class metadata providing information on the second server used to manage volumes indicated in the first volume metadata and indicated in the first storage pool metadata;
  copying the first metadata to the second storage environment to incorporate with the second metadata, wherein incorporating the first metadata into the second metadata comprises including the first data object metadata, first volume metadata, first storage pool metadata, and first device class metadata into the second data object metadata, second volume metadata, second storage pool metadata, and second device class metadata, respectively;
  modifying the first device class metadata incorporated into the second device class metadata to indicate first server information used by the second server to communicate with the first server to access the migrated data from the first storage media; and
  completing the migration request in response to incorporating the first metadata into the second metadata, wherein the first data objects remain in the first storage media after completing the migration request, and wherein the first data objects are copied to the second storage media after completing the migration request.

11. The method of claim 10, wherein prior to processing the migration request, the first server uses the first metadata to perform storage management operations with respect to the first data objects, further comprising:
  using, by the second server, the first metadata incorporated into the second metadata to perform storage management operations with respect to the first data objects stored in the first server.

12. The method of claim 11, further comprising:
  invalidating the first metadata in the first storage environment in response to the migration request, wherein following the completion of the migration request, the first server does not perform storage management operations with respect to the first data objects in the first storage media.

13. The method of claim 11, wherein the storage management operations comprise handling client requests for storing and retrieving the first data objects stored in the first storage media and enforcing policies for data placement and retention of the first data objects in the first storage media, and wherein following the completion of the migration request, the first server performs primitive storage functions in response to communications from the second server comprising mount, locate, write and read operations.

14. The method of claim 10, further comprising:
  receiving, in the second storage environment, a storage operation request;
  determining, by the second server, from the first metadata incorporated into the second metadata that the storage operation request is directed to a location in the first storage media;
  sending, by the second server, commands to the first server to have the first server implement the storage operation request with respect to the first storage media.

15. The method of claim 14, wherein the first metadata incorporated into the second metadata indicates a network address of the first server and identifier of a volume including the first data objects in the first storage media, and wherein sending the request comprises sending the request to the network address of the first server indicating the volume including the requested data.

16. The method of claim 10, further comprising:
  moving data objects described in the second data object metadata from the first storage media to a new location in the first storage media or the second storage media or from the second storage media to a new location in the first storage media; and
  updating the second data object metadata for the moved data objects to indicate the new location of the moved data objects in the first storage media or the second storage media.

17. A system, comprising:
  a first storage environment having a first storage server, a first storage media, and first metadata describing first data objects stored in the first storage media, wherein the first metadata includes first data object metadata providing information on the first data objects in the first storage media, including a volume in which each first data object is stored, first volume metadata including information on volumes in the first storage media, first storage pool metadata providing information on volumes associated with the storage pool, and first device class metadata providing information on the first server used to manage volumes indicated in the first volume metadata and indicated in the first storage pool metadata;
  a second storage environment having a second storage server, a second storage media, and second metadata for second data objects stored in the second storage media, wherein the second metadata includes second data object metadata providing information on the second data objects in the second storage media, including a volume in which each second data object is stored, second volume metadata including information on volumes in the second storage media, second storage pool metadata providing information on volumes associated with the storage pool, and second device class metadata providing information on the second server used to manage volumes indicated in the first volume metadata and indicated in the first storage pool metadata; and a computer readable storage medium having code executed by a processor to perform operations, the operations comprising:

processing a migration request to migrate metadata and storage management of data in the first storage environment to the second storage environment;

copying the first metadata to the second storage environment to incorporate with the second metadata, wherein incorporating the first metadata into the second metadata comprises including the first data object metadata, first volume metadata, first storage pool metadata, and first device class metadata into the second data object metadata, second volume metadata, second storage pool metadata, and second device class metadata, respectively;

modifying the first device class metadata incorporated into the second device class metadata to indicate first server information used by the second server to communicate with the first server to access the migrated data from the first storage media; and completing the migration request in response to incorporating the first metadata into the second metadata, wherein the first data objects remain in the first storage media after completing the migration request, and wherein the first data objects are copied to the second storage media after completing the migration request.

18. The system of claim 17, wherein prior to processing the migration request, the first server uses the first metadata to perform storage management operations with respect to the first data objects, further comprising:

using, by the second server, the first metadata incorporated into the second metadata to perform storage management operations with respect to the first data objects stored in the first server.

19. The system of claim 18, wherein the operations further comprise:

invalidating the first metadata in the first storage environment in response to the migration request, wherein following the completion of the migration request, the first server does not perform storage management operations with respect to the first data objects in the first storage media.

20. The system of claim 18, wherein the storage management operations comprise handling client requests for storing and retrieving the first data objects stored in the first storage media and enforcing policies for data placement and retention of the first data objects in the first storage media, and wherein following the completion of the migration request, the first server performs primitive storage functions in response to communications from the second server comprising mount, locate, write and read operations.

21. The system of claim 17, wherein the second server executes code to perform operations, the operations comprising:

receiving, in the second storage environment, a storage operation request;

determining, by the second server, from the first metadata incorporated into the second metadata that the storage operation request is directed to a location in the first storage media;

sending, by the second server, commands to the first server to have the first server implement the storage operation request with respect to the first storage media.

22. The system of claim 21, wherein the first metadata incorporated into the second metadata indicates a network address of the first server and identifier of a volume including the first data objects in the first storage media, and wherein sending the request comprises sending the request to the network address of the first server indicating the volume including the requested data.

23. The system of claim 17, wherein the operations further comprise:

moving data objects described in the second data object metadata from the first storage media to a new location in the first storage media or the second storage media or from the second storage media to a new location in the first storage media; and updating the second data object metadata for the moved data objects to indicate the new location of the moved data objects in the first storage media or the second storage media.

* * * * *